United States Patent [11] 3,622,386

[72] Inventor Robert E. Larsen
Santa Clara, Calif.

[21] Appl. No. 751,052
[22] Filed Aug. 8, 1968
[45] Patented Nov. 23, 1971
[73] Assignee Memorex Corporation
Santa Clara, Calif.

[54] METHOD OF MAKING MAGNETIC RECORDING DISCS

6 Claims, No Drawings

[52] U.S. Cl. 117/235, 117/237, 252/62.54
[51] Int. Cl. H01f 10/02
[50] Field of Search 117/235, 237; 252/62.54

[56] References Cited

UNITED STATES PATENTS

| | | | |
|---|---|---|---|
| 997,498 | 7/1911 | Headson | 117/235 |
| 2,418,479 | 4/1947 | Pratt et al. | 117/235 UX |
| 2,594,893 | 4/1952 | Faus | 117/235 UX |
| 2,857,879 | 10/1958 | Johnson | 117/235 UX |
| 3,249,466 | 5/1966 | Luster | 117/235 |
| 3,069,815 | 12/1962 | Valentine | 117/235 UX |

OTHER REFERENCES

IBM Tech. Dis. Bull. Vol. 9, No. 7, Dec. 1966, page 779, Friedman et al.

Lange, Handbook of Chemistry, page 66, 7th edition

*Primary Examiner*—William D. Martin
*Assistant Examiner*—Bernard D. Pianalto
*Attorney*—Limbach, Limbach & Sutton

ABSTRACT: A method of making magnetic recording discs including adding to a fluid mixture of magnetic particles and binder resin between 1 and 10 weight percent of abrasive particles which have a hardness of at least seven and a particle size between 50 and 100 percent of the thickness of the magnetic recording layer to be made with the mixture. Preferably, the method is carried out in two stages with the magnetic particles and at least part of the resin binder extensively milled to homogeniety in a first step with the abrasive particles mixed into the mixture in a second mixing step.

METHOD OF MAKING MAGNETIC RECORDING DISCS

Magnetic recording discs are used in apparatus such as that shown in Pattison U.S. Pat. No. 3,176,281 where a magnetic recording disc is rotated at high speed in cooperation with a magnetic recording head which flies on an air layer developed by frictionally induced air movement with the rotating recording disc. The magnetic recording discs may be made by spraying or spin coating onto a disc-shaped substrate a fluid mixture of magnetic particles and resinous binder and thereafter curing the resinous binder to adhere the magnetic particles to each other and to the disc. Fluid mixtures of resins and magnetic particles which may be used for this purpose are disclosed in the following U.S. Pat. Nos.: Hagopian, 2,914,480 and Johnson et al. 3,058,844; and in the copending application of Louis M. Higashi, Ser. No. 619,017, filed Feb. 27, 1967, and now abandoned.

The conditions of operation of magnetic recording discs of this type dictate very rigorous physical characteristics of the discs to permit the discs to operate satisfactorily both from the standpoint of their magnetic properties and their physical properties. One test which is often performed on discs of this type to determine their satisfactory physical properties is known as the contamination test in which a disc is rotated at operating speed with a magnetic recording head flying over the surface of the disc, and a physical contaminant such as loose particles of iron powder are dropped onto the disc immediately in advance of the magnetic recording head. The loose particles on the recording disc interfere with the "flying" condition of the recording head and cause the head to crash into the disc. In the contamination test, the quality of the magnetic recording disc is evaluated by measuring the time lapse between the time when the head crashes and the time when it recovers and commences to "fly" again over the recording surface of the disc.

The situation encountered by the recording disc during the contamination test is a much more serious operating condition than should ever be encountered in the normal operation of the apparatus, but the results of the contamination test appear to provide a very worthwhile indication of the quality of the disc. Where long recovery times are noted in the contamination test, the discs appear to have poor physical properties which result in short life for the disc and an increased hazard of permanent damage to the disc and the recording head as a result of an occasional head crash.

I have discovered that the physical properties of magnetic recording discs, as measured by the contamination test, may be improved substantially by incorporating into the fluid mixture from which the recording surface is made a small amount of abrasive particles having a hardness of at least 7 on the Mohs Scale and a particle size which is at least 50 percent and not substantially greater than 100 percent of the thickness of the magnetic recording layer. The abrasive particles should be incorporated in the mixture in an amount of between 1 and 10 weight percent, and preferably between 3 and 6 weight percent based on the total weight of solids in the mixture, that is based on the total weight of magnetic particles and resin components, but excluding the weight of solvents.

When magnetic recording discs are prepared in accordance with this invention, tremendous improvements are obtained in the contamination test results on the discs. As indicated below, magnetic recording discs prepared in accordance with this invention can obtain substantially instantaneous recovery in the contamination test whereas discs prepared without incorporating the abrasive particles of this invention, but prepared by an otherwise identical method demonstrate appreciable periods of time before recovery and often no recovery in the contamination test.

While I do not wish to be limited to any theory of operation of this invention, I believe that the beneficial results of this invention are obtained because the abrasive particles remove particles of magnetic oxide and resin binder which are welded to the recording head when the head initially crashes on the disc. Where magnetic recording discs are not made in accordance with this invention, slight deposits of magnetic oxides and resin may be detected on the recording head used with the discs both after testing the discs in the contamination test and after long periods of use a recording head on the discs. Where, in the contamination test, the recording head actually does not recover from a head crash, I believe the failure to recover is caused by these deposits of magnetic particles and resin welded to the surface of the head which through continuing contact with the magnetic recording layer on the disc abrade the recording surface of the disc and further develop in size until the recording head and recording surface score and gall each other. I believe that this mode of operation truly occurs and that manufacture of the discs in accordance with this invention removes deposits of magnetic particles and resin from the recording heads because I have found that recording discs manufactured in accordance with the method of this invention will clean such deposits from recording heads which have previously accumulated from prior art discs.

Thus, I have observed that small deposits of magnetic particles and resin binder welded to the recording head used with discs of the prior art are actually removed when that recording head is used on recording discs manufactured in accordance with the principles of this invention.

As indicated above, the abrasive particles which are incorporated into the magnetic recording mixture in accordance with this invention should have a hardness of at least 7 on the Mohs Scale. Abrasive particles with hardness less than 7 may be used in certain instances, particularly where they are employed in large concentrations. However, the use of large concentrations of nonmagnetic abrasive particles causes deterioration in the magnetic properties of the recording disc because the magnetic particles introduce a certain amount of noise into signals reproduced from the disc. Suitable abrasive particles for use in accordance with this invention include flint having a hardness of 7, garnet having a hardness of 8, and alumina and silicon carbide both having a hardness of about 9. The alumina and silicon carbide operate substantially better in this invention than the flint and garnet.

I have found that the particle size and shape of the abrasive particles used in this invention are both quite important. The size of the abrasive particles should be at least 50 percent and not substantially greater than 100 percent of the ultimate thickness of the magnetic recording layer on the recording discs. The abrasive particles apparently provide abrasive surfaces at the top surface of the recording layer, and I believe that where the particles are too small they become lost in the interior of the recording layer and do not perform their desirable function. On the other hand, when the abrasive particles are larger than the final thickness of the recording layer which is made with them, they provide serious problems in the final finishing of the recording surface. The recording surfaces of magnetic recording discs of this type are generally subjected to extensive polishing operations after the fluid mixture is deposited and cured on the disc. Where the abrasive particles incorporated into the mixture are larger than the ultimate thickness of the recording layer, the particles project above the surface of the cured recording layer and interfere with polishing in two ways, namely first by causing excessive polishing times during which the projecting part of the abrasive particle is polished off and, secondly by providing small imperfections in the polished recording surface where an abrasive particle may have been completely pulled out of the recording layer during the polishing operation.

Not only is the particle size important for the abrasive particle, but also the particle shape is quite important. During experimentation with abrasive particles for use in this invention, I have prepared substantially identical recording mixtures with two different batches of powdered alumina where the alumina particles in the two batches have substantially the same particle size but where the alumina particles in one batch were smooth and rounded while the alumina particles in the other batch had sharp cutting edges. Magnetic recording discs made by the method of this invention with the rounded particles exhibited a substantial improvement in the contamination test, but only about one-half the improvement obtained with the sharp alumina particles.

While the method of this invention may be used with the magnetic recording mixtures disclosed in the above-identified Hagopian and Johnson patents and in other mixtures, I prefer to employ the method of the invention in connection with the magnetic recording mixtures disclosed in the above-identified Higashi application, and the following specific example of operation of the method of this invention illustrated my invention in connection with the magnetic recording materials disclosed in said Higashi application.

EXAMPLE 1

(Preparation of Mill Base)

A common Mill base was prepared as follows for use in two comparative examples. To a stainless steel drum was added:

40.877 kilograms Cellosolve (Ethylene glycol monoethyl ether)
5.110 kilograms Hexanol
5.110 kilograms Xylene
46.440 kilograms Iron Oxide This mixture was mixed for 30 minutes on a Cowles mixer and then allowed to stand for 12 hours. To this solution was added: 37.463 kilograms of 60 percent Epon 1001 (Shell Chemical Company) in an 80/10/10 solvent. The 80/10/10 solvent is a mixture of 80 parts by weight Cellosolve, 10 parts by weight Xylene, and 10 parts by weight Hexanol. This mixture was then mixed for an additional 30 minutes on a Cowles mixer.

One hundred and twenty kilograms of the above solution was charged into a 20 gallon Sweco vibrant energy mill containing 60 percent cylindrical and 40 percent cubic ½-inch ceramic media. The solution was milled for 48 hours and then used for formulating the following samples.

EXAMPLES 2 AND 3

| Ingredient | Examples 2 | Examples 3 |
|---|---|---|
| Mill base (above) | 800 g. | 800 g. |
| Epon 1001 at 60%[a] | 119.8 g. | 119.8 g. |
| D.E.N. 438 at 85%[b] | 44.3 g. | 44.3 g. |
| Resimene 740 at 90%[c] | 30.0 g. | 30.0 g. |
| N-aminoethylpiperazine | 5.4 g. | 5.4 g. |
| 80/10/10 solvent | 235.0 g. | 185.0 g. |
| silicon carbide 600 at 25%[d] | | 66.0 g. |

NOTES:
[a] Epon 1001 (Shell Chemical) at 60% solids in 80/10/10 solvent.
[b] D.E.N. 438 (Dow Chemical) at 85% solids in methylethyl ketone.
[c] Resimene 740 (Monsanto Chemical) at 90% solids in isopropyl alcohol.
[d] The silicon carbide employed was a silicon carbide sold by the Norton Company under the trade designation Crystolon 600 which has been further processed by slurrying in 80/10/10 solvent and milling for 2 hours in a 1-quart jar mill with half-inch square ceramic media. The processed material was filtered to remove large particles and had a particle size of approximately 5 microns.

The above components of examples 2 and 3 were subjected to identical blending to uniformity by mixing for a short period in a high-shear mixer, and the formulations were then spray coated onto aluminum disc substrates. The coated discs were cured for 2 hours at 220° C. The discs were then polished using conventional sandpaper to generate a finish having a centerline average of less than 4 microinches (as measured on a Model 4 Bendix Profilometer equipped with a 100-microinch stylus) and having a final coating thickness of approximately 200 microinches.

All of the discs prepared with the fluid mixtures of examples 2 and 3 were tested on the contamination test. The results of these tests showed head recovery after crashing on only 15 percent of the discs made with the fluid mixture of example 2, and recovery times were between 15 and 20 seconds for those discs of example 2 which did recover. For the discs prepared with the fluid mixture of example 3, head recovery time was instantaneous or less than 1 second on all discs.

It will be noted in the above examples that the mixing of the fluid mixture in accordance with this invention in example 3 involves a two-stage mixing with long term milling in the first stage and short period high-shear mixing in the second stage. The abrasive particles of silicon carbide were incorporated into the fluid mixture in the second stage of mixing in example 3, and this constitutes a greatly preferred procedure in the method of this invention since the action of the milling media in the first stage is thereby prevented from degrading the abrasive particles into particle sizes which would be less effective.

While certain features and advantages of the invention have been described in detail herein, it is obvious that many modifications thereof may be made without departing from the spirit and scope of the invention.

I claim:

1. In a method of making a magnetic recording disc having abrasive particles at the top surface of the recording layer comprising:
A. preparing a fluid mixture containing magnetic particles and a curable resin for binding said particles together and bonding said particles to a disc, and
B. forming said mixture into a cured recording layer of predetermined thickness on a disc,
the improvement comprising:
adding to said fluid mixture between 1 and 10 weight percent, based on the total weight of magnetic particles and curable resin in said mixture, of abrasive particles where said abrasive particles have a hardness of at least 7 on the Mohs Scale and a particle size which is at least 50 percent and not substantially greater than 100 percent of said predetermined thickness.

2. The method of claim 1 characterized further in that said abrasive particles are formed of silicon carbide.

3. The method of claim 1 characterized further in that said abrasive particles are added to said fluid mixture in an amount of between 3 and 6 weight percent based on the total weight of magnetic particles and curable resin in said mixture.

4. A method of making magnetic recording discs having a magnetic recording layer of a predetermined thickness having abrasive particles at the top surface of the recording layer which comprises:
A. preparing a fluid mixture containing magnetic particles and a curable resin for binding said particles together and bonding said particles to a disc;
B. milling said fluid mixture to a condition of substantial homogeniety;
C. then adding to said milled mixture between 1 and 10 weight percent, based on the total weight of magnetic particles and resin in said mixture, of abrasive particles where said abrasive particles have a hardness of at least 7on the Mohs Scale and sharp cutting edges and a particle size which is at least 50 percent and not substantially greater than 100 percent of said predetermined thickness;
D. then mixing said milled mixture and added abrasive particles to a condition of substantial homogeniety, and;
E. finally forming said mixture into a cured recording layer of predetermined thickness on a disc.

5. The method of claim 4 characterized further in that said abrasive particles are formed of silicon carbide.

6. The method of claim 4 characterized further in that said abrasive particles are added to said milled mixture in an amount of between 3 and 6 weight percent based on the total weight of magnetic particles and curable resin in said mixture.

* * * * *